United States Patent [19]

Green et al.

[11] Patent Number: 5,131,488

[45] Date of Patent: Jul. 21, 1992

[54] SEISMIC SOURCES

[75] Inventors: Michael A. Green, Oakland; Neville G. W. Cook, Lafayette; Thomas V. McEvilly, Berkeley; Ernest L. Majer, El Cirrito; Paul A. Witherspoon, Berkeley, all of Calif.

[73] Assignee: The United States of America as represented by the United States Department of Energy, Washington, D.C.

[21] Appl. No.: 303,093

[22] Filed: Jan. 26, 1989

Related U.S. Application Data

[63] Continuation of Ser. No. 39,887, Apr. 20, 1987, abandoned.

[51] Int. Cl.$^5$ .............................................. G01V 1/40
[52] U.S. Cl. ..................... 181/106; 181/108; 181/113; 181/121; 367/75; 367/189
[58] Field of Search .................. 367/25, 75, 911, 912; 181/101, 102, 105, 106, 108, 113, 119, 121

[56] References Cited

U.S. PATENT DOCUMENTS

| | | | |
|---|---|---|---|
| 2,604,181 | 7/1952 | Basham et al. | 181/105 |
| 4,103,756 | 8/1978 | Trulio et al. | 181/121 |
| 4,207,961 | 6/1980 | Kitsunezaki | 181/106 |
| 4,252,210 | 2/1981 | Sodich | 181/119 |
| 4,319,345 | 3/1982 | Dennis | 367/25 |
| 4,380,806 | 4/1983 | Waters et al. | 367/27 |
| 4,383,591 | 5/1983 | Ogura | 181/106 |
| 4,394,754 | 7/1983 | Waters | 367/75 |
| 4,430,682 | 2/1984 | Babsch | 361/101 |
| 4,446,541 | 5/1984 | Cowles | 367/75 |
| 4,463,825 | 8/1984 | Lerwill | 181/113 |
| 4,549,630 | 10/1985 | Brown | 181/106 |
| 4,575,830 | 3/1986 | Ingram et al. | 367/26 |
| 4,634,191 | 1/1987 | Studer | 310/90.5 |
| 4,702,343 | 10/1987 | Paulsson | 181/106 |
| 4,715,470 | 12/1987 | Paulsson | . |

FOREIGN PATENT DOCUMENTS 0672588 7/1979 U.S.S.R. .

Primary Examiner—J. W. Eldred
Attorney, Agent, or Firm—Miguel A. Valdes; Roger S. Gaither; William R. Moser

[57] ABSTRACT

Apparatus is described for placement in a borehole in the earth, which enables the generation of closely controlled seismic waves from the borehole. Pure torsional shear waves are generated by an apparatus which includes a stator element fixed to the borehole walls and a rotor element which is electrically driven to rapidly oscillate on the stator element to cause reaction forces transmitted through the borehole walls to the surrounding earth. Logitudinal shear waves are generated by an armature that is driven to rapidly oscillate along the axis of the borehole relative to a stator that is clamped to the borehole, to cause reaction forces transmitted to the surrounding earth. Pressure waves are generated by electrically driving pistons that press against opposite ends of a hydraulic reservoir that fills the borehole. High power is generated by energizing the elements at a power level that causes heating to over 150° C. within one minute of operation, but energizing the elements for no more than about one minute.

14 Claims, 3 Drawing Sheets

SEISMIC SOURCES

The Government has rights in this invention pursuant to Contract No. DE-AC03-76SF00098 awarded by the U.S. Department of Energy.

This is a continuation of application Ser. No. 039,887, filed Apr. 20, 1987, now abandoned.

BACKGROUND OF THE INVENTION

Seismic sources that generate waves from deep within the earth, where the waves are of controlled character (shear or pressure in controlled directions), and that are coherent at frequencies of a plurality of hertz, are useful in seismic exploration. This is because the reflection of seismic waves from a geological strata depends upon the frequency of the waves and the distance from the source as a function of $e^{f/c}$ where f is frequency and c is the speed of sound. One technique for generating longitudinal shear waves from deep within a borehole, is to place a hydraulic actuator within the borehole, with the cylinder of the actuator clamped to the borehole wall, and to drive the actuator from a hydraulic source at the surface of the earth. Considerable power can be lost in transmitting high-pressure hydraulic fluid through a long depth of borehole, and it is difficult to closely control oscillations of high-pressure hydraulic fluids. A system which enabled the generation of a variety of seismic waves using an apparatus of relatively moderate cost located deep within a borehole, would be of considerable value.

SUMMARY OF THE INVENTION

In accordance with one embodiment of the present invention, apparatus is provided for efficiently and closely controllably generating seismic waves at a location deep within a borehole. The apparatus includes at least one stator coupled to the walls of a borehole and at least one armature or moveable member which is electrically energizable to move relative to the stator. In a system for generating torsional shear waves, electrical energy rapidly oscillates a rotor with respect to a stator. In a system for generating longitudinal shear waves, an armature oscillates along the axis of the borehole relative to the stator. In a system for generating pressure waves, a pair of electrically driven pistons move synchronously together and apart to compress a hydraulic reservoir along the length of the borehole so as to cause the reservoir to press outwardly against the borehole walls. A pair of shear wave generators can be located close to one another within a borehole, and operated synchronously to generate controllably polarized waves.

High forces are generated in a relatively small borehole by driving the devices at a higher electrically power level than can be sustained continuously. Although this causes rapid heating of the apparatus, the energization is continued for a short enough time such as for no more than about one minute, so the electrical insulation of the device does not overheat.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
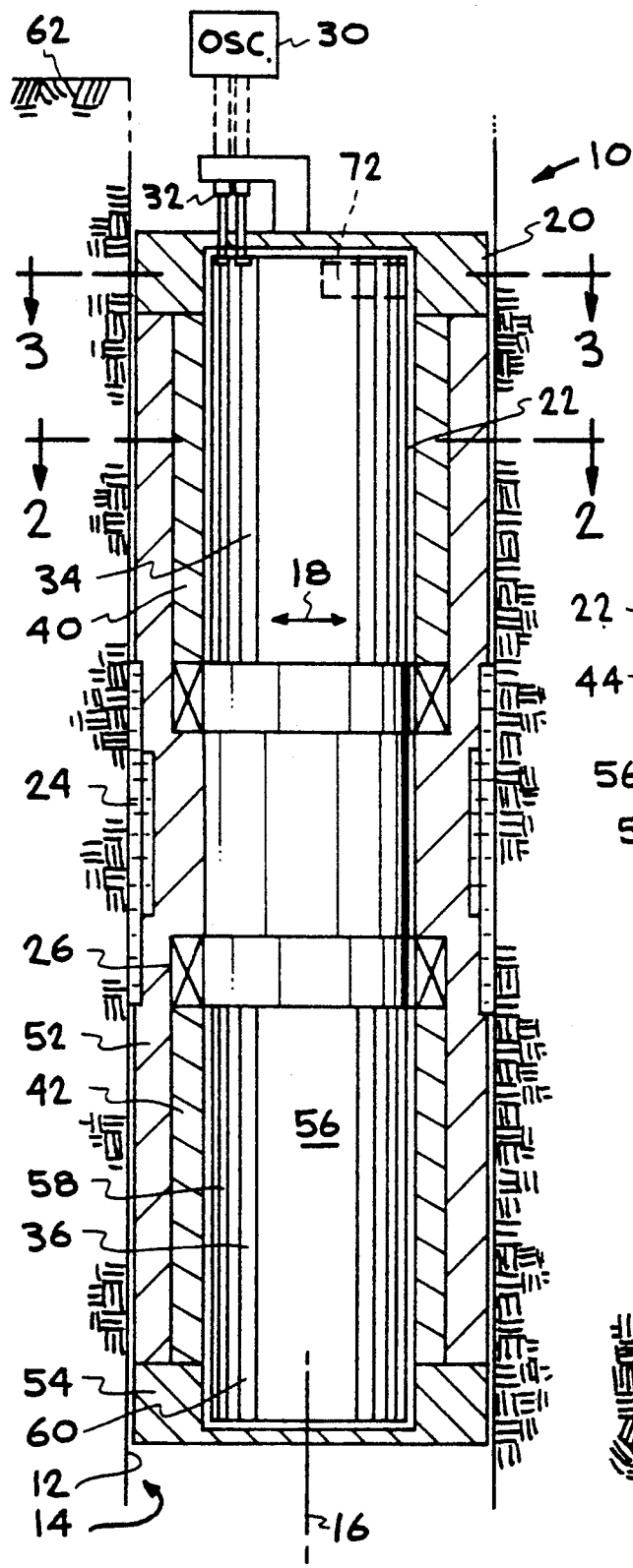
FIG. 1 is a sectional view of a torsional shear wave generating apparatus constructed in accordance with one embodiment of the present invention.
Figure 2:
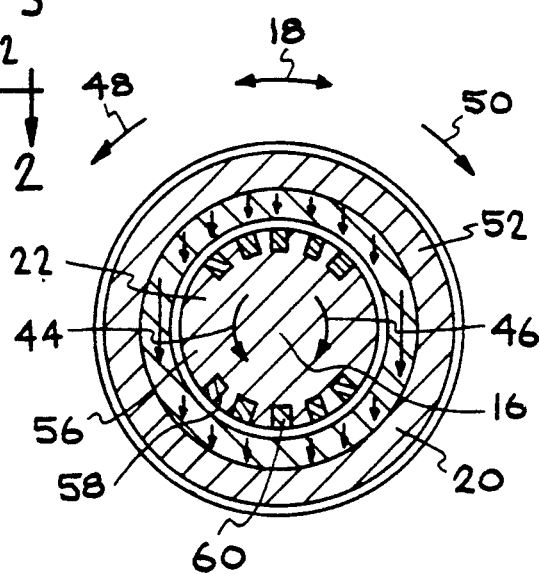
FIG. 2 is a view taken on the line 2—2 of FIG. 1.

FIGS. 1 and 2 illustrate an apparatus 10 which is placed in a portion 12 of a borehole 14. The borehole portion 12 lies deep within the ground and extends along an axis 16 which is generally primarily vertical. The apparatus is designed to generate torsional shear waves indicated by arrows 18, at a controllable frequency and preferably with a controllable harmonic content. The apparatus includes a stator element 20 which is clamped by a hydraulic clamp 24 tightly to the walls of the borehole 14. An armature element in the form of a rotor 22 is rotatably mounted within the stator element by bearings 26. A controllable oscillator 30 with a high amperage output is electrically connected through a coupling 32 to the rotor to energize coiled electrical conductors 34, 36 thereon. The stator contains permanent magnets 40, 42 lying adjacent to the coils 34, 36 on the rotor to generate interacting magnetic fields. That is, the permanent magnets 40, 42 generate permanent magnetic fields, while the currents from the oscillator 30 generate interacting magnetic fields that cause the rotor to turn. The polarity of currents from the oscillator 30 varies with time, to urge the rotor to turn first in one direction 44, and then in the other 46, to cause the rotor to oscillate back and forth about a center position indicated in FIG. 2.

As the current through the rotor coil produces a torque that urges the rotor to turn in one direction such as 44, the rotor rapidly accelerates in that direction. Since the magnetic field causing such rotational acceleration interacts with the stator 20, and there is conservation of rotational momentum, the stator experiences an equal and opposite torque urging it to rotate in the direction of arrow 50. The stator is clamped to the walls of the borehole and cannot rotate, but this impulse is transmitted by the stator to the walls of the borehole. The result is the creation of a torsional shear wave in the walls of the borehole, which propagates perpendicular to the axis 16 away from the center of the borehole.

After the rotor has turned by several degrees or less in one direction 44, the polarity of the voltage supplied through the coupling 42 to the coils of the rotor is reversed, thereby causing the rotor to rapidly accelerate in the opposite direction of rotation 46. Of course, this causes the stator 20 to receive an opposite torque in the direction of arrow 48. This results in the propagation of an opposite torsional shear wave into the surrounding earth from the borehole.

The particular apparatus 10 is formed with a stator 20 having a soft iron housing 52 and soft iron endcaps 54 that provide an iron flux return path for the magnetic fields. The magnets 40, 42 are mounted on the housing. The rotor 22 consists primarily of a cylinder 56 of soft iron with slots 58 containing current-carrying conductors 60. The current-carrying conductors create magnetic fields interacting with the magnetic fields of the permanent magnets to urge rotation of the rotor clockwise or counterclockwise depending upon the direction of current through the conductors. The construction is largely similar to that of direct current motors, except that it is optimized for maximum force over small angles of rotation of about 10° or less. The electrical coupling 32 can comprise conventional slip rings or can be formed of bendable conductors which need bend only a moderate amount as the rotor turns by limited angles back and forth.

In one apparatus 10 that has been designed for placement in a borehole of 5 inch diameter, the oscillator 30 is constructed to apply a tuneable frequency between 30 and 300 Hz for an operational period for up to 60 seconds. At the lowest frequency of about 30 Hz the rotor rotates ±8° about a central orientation, while at 300 Hz the rotor rotates back and forth about 0.2° from an initial position.

Because of the space constraints, shear waves of large energy can be generated only by driving the rotor at high current levels. This is accomplished by using such high currents that if continued for a few minutes, the insulation on the conductors 58 would burn out. However, the currents are applied for only a limited period of time such as about 30 seconds, during which time the insulation becomes hot but not hot enough to become damaged. The generated heat is not rapidly dissipated, but is stored primarily in the rotor as its temperature rises. Available insulation cannot withstand heating above about 250° C. During the generation of torsional waves applicant applies sufficient current for a period of less than one minute, which heats the insulation to a temperature above 150° C., but less than 250° C., the current being of a magnitude that would heat the insulation above 250° C. if continued for five minutes. The fact that the rotor is constructed of iron and copper (in the conductors) which both have relatively high specific heats, results in their ability to absorb considerable heat with only a moderate temperature rise. The magnets 40, 42 are preferably formed of samarium cobalt, which can undergo considerable heating to about 250° C. without losing their magnetism.

Although applicant uses a permanent magnet on the stator element, it is possible to place the permanent magnet on the rotor element and electrically energize coils on the stator element. It is even possible to electrically energize coils on both the stator and rotor, although this is generally inefficient. In this embodiment of the invention the only force-transmitting relationship is through magnetic fields, so there is not direct (through solid or liquid material) force-transmitting engagement of the elements.

Figure 3:
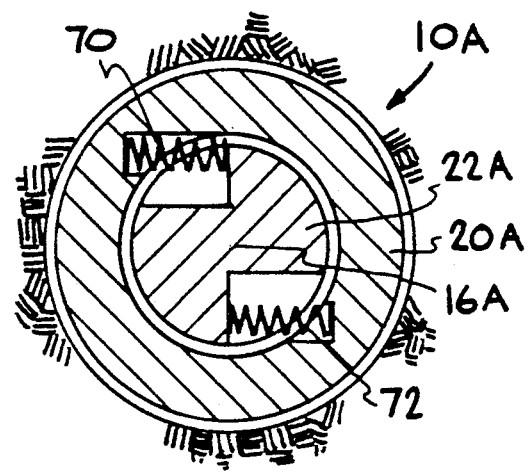
FIG. 3 is a sectional axial view of a torsional shear wave generator constructed in accordance with another embodiment of the invention, which relies upon resonances to increase the power output of the apparatus, and which represents a view taken on line 3—3 of FIG. 1 but with elements in phantom lines shown in solid lines.

FIG. 3 is a sectional view similar to one taken on the line 3—3 of FIG. 1, but with springs 70, 72 coupling the rotor 22A and stator 20A of the seismic apparatus 10A. The springs 70, 72 are chosen with respect to the angular momentum of the rotor about its axis 16A, so that the spring suspension is resonant at a desired frequency such as 50 Hz at which the rotor is to be oscillated. The oscillator 30 which electrically energizes the rotor is then controlled to oscillate the rotor at the resonant frequency. This permits the generation of large torsional shear waves with minimal energization.

The electrical power used to drive the oscillator 30, and the oscillator 30 itself, may be placed at the surface 62 of the earth. The electrical power is passed through electrical cables extending along the borehole to the seismic generating apparatus. Although this involves some expense and power loss, it is considerably less than occurs for hydraulic powering fluids.

Figure 4:
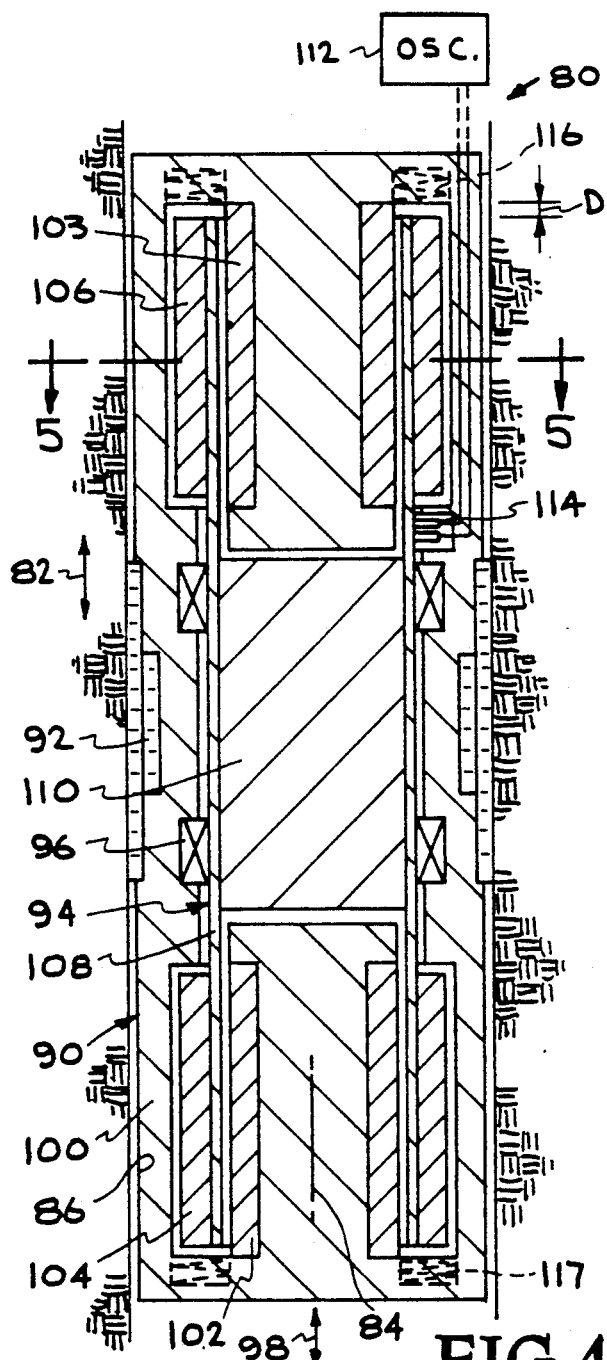
FIG. 4 is a sectional view of a longitudinal shear wave generator constructed in accordance with another embodiment of the invention.
Figure 5:
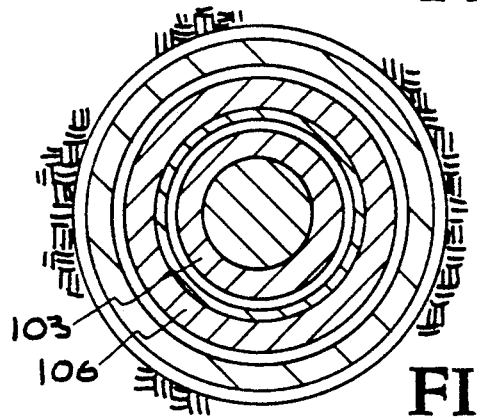
FIG. 5 is a view taken on the line 5—5 of FIG. 4.

FIGS. 4 and 5 illustrate another seismic apparatus 80 which is constructed to generate longitudinal or axial shear waves indicated at 82, which are directed parallel to the axis 84 of the borehole portion 86 in which the apparatus lies. The apparatus includes a stator 90 which is fixed by a hydraulic or other clamp 92 to the walls of the borehole, and an armature 94 which is mounted on slider bearings 96 that permit the armature to slide in directions 98 along the borehole axis. The stator includes a housing 100 with portions lying both radially inside and outside the armature, and which include a pair of magnets 102, 103 that establish magnetic fields. The armature includes electrical conductors wound in coils 104, 106 and that are attached to a frame 108 that slides on the bearings. A soft iron core 110 mounted on the armature frame moves with it to enhance the magnetic fields and to add mass to the armature.

An oscillator 112 is connected through electrical couplings 114 to the armature. The oscillator 112 energizes the coils at a frequency between about 30 Hz and 300 Hz to cause the armature to move up and down along the axis 84 of the borehole. In one design for a borehole of 5 inch diameter and a stator and armature apparatus of a length of about 20 inches, the armature was designed to move a maximum distance D of about 1 cm at the lowest frequency of 30 Hz. The distance was reduced to about 0.01 cm at a frequency of 300 Hz. As in the case of the torsional shear wave generator apparatus of FIGS. 1 and 2, the longitudinal shear wave generating apparatus 80 is designed to be driven at a high power level for a short period of time, of generally less than one minute. At that time, the coils 104, 106 heat to a temperature of over 150° C., and preferably over 200° C., but still less than the 250° C. which would be likely to damage the insulation on the wires of the coil. In this way, high amplitude shear waves are generated with an apparatus of minimal size, by allowing the generated heat to be stored in the armature and stator during a limited period of electrical excitation of them.

FIG. 4 shows, in phantom lines, two stacks of Belleville springs 116, 117 that can be used to suspend the armature 94 so it has a resonant frequency of axial oscillations. The electrical oscillator circuit 112 is driven at that frequency, to create large accelerations with a small power input. It is possible to alter the resonant frequency.

Figure 8:
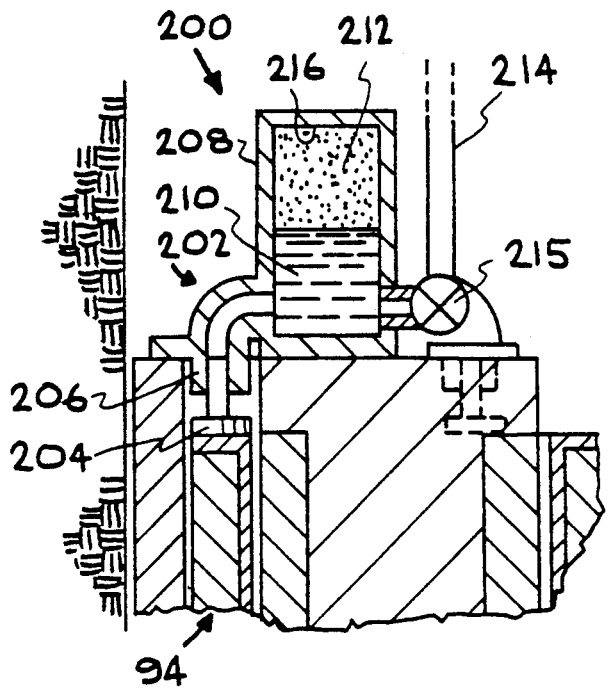
FIG. 8 is a partial sectional view of a generator similar to that of FIG. 4, but with a spring means having a variable spring rate.

FIG. 8 illustrates another spring device 200 that can be used to suspend the armature 94. The device 200 permits controlled variation in spring constant, to thereby alter the resonant frequency of axial vibrations of the armature. The device 200 includes three hydraulic actuators 202 evenly spaced about the armature axis. Each actuator includes a piston 204 having one end bearing against the armature 94 and another end within a hydraulic cylinder 206. The hydraulic cylinder is connected to a reservoir 208 containing hydraulic liquid 210 at the bottom and trapped gas 212 at the top. Hydraulic liquid can be added or substracted from the reservoir through a fill pipe 214 and valve 215. The spring constant of the device 200 increases proportionately to the pressure of the gas 212 and inversely proportional with the length of the gas space 216. Thus, adding sufficient hydraulic fluid to decrease the gas space 216 to one-half, increases the spring rate by four times. The armature 94 can be oscillated at any frequency within a wide range, with the spring device 200 altered so that the armature suspension is resonant to the particular frequency at which the armature is to be oscillated. This permits efficient generation of shear waves over a range of frequencies.

Figure 9:
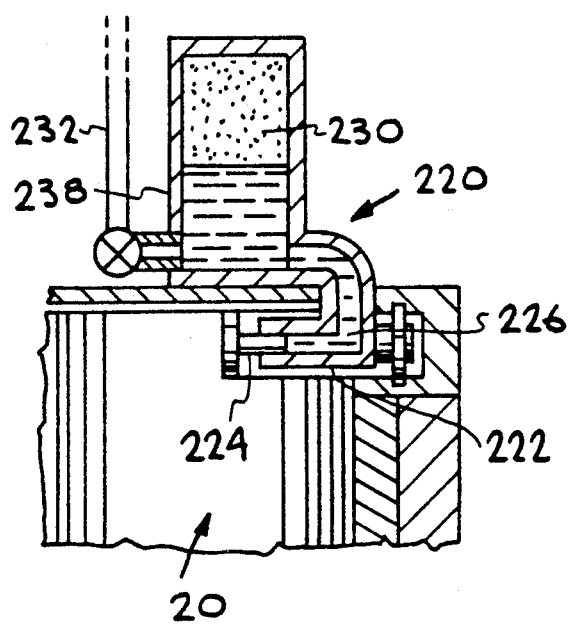
FIG. 9 is a partial sectional view of a generator similar to that of FIG. 1, but with a spring means having a variable spring rate.

FIG. 9 illustrates a torsional shear wave generator similar to that of FIGS. 1 and 3, wherein a variable spring rate spring device 220 is used to permit resonant oscillation of the rotor 20 at any frequency within a wide range. The spring device 220 includes two hydraulic actuators 222 evenly spaced about the rotor axis. Each actuator includes a piston 224 with one end bearing against the rotor 20 and another end received in a cylinder 226. Hydraulic fluid in the cylinder is coupled to hydraulic fluid in a reservoir 228 which includes compressed gas 230. A fill pipe 232 can change the height of the gas-containing portion of the reservoir and the pressure of gas therein, to vary the spring rate. The spring rate is varied so the armature oscillates at a resonant frequency equal to that at which it is desired to oscillate the armature.

Figure 6:
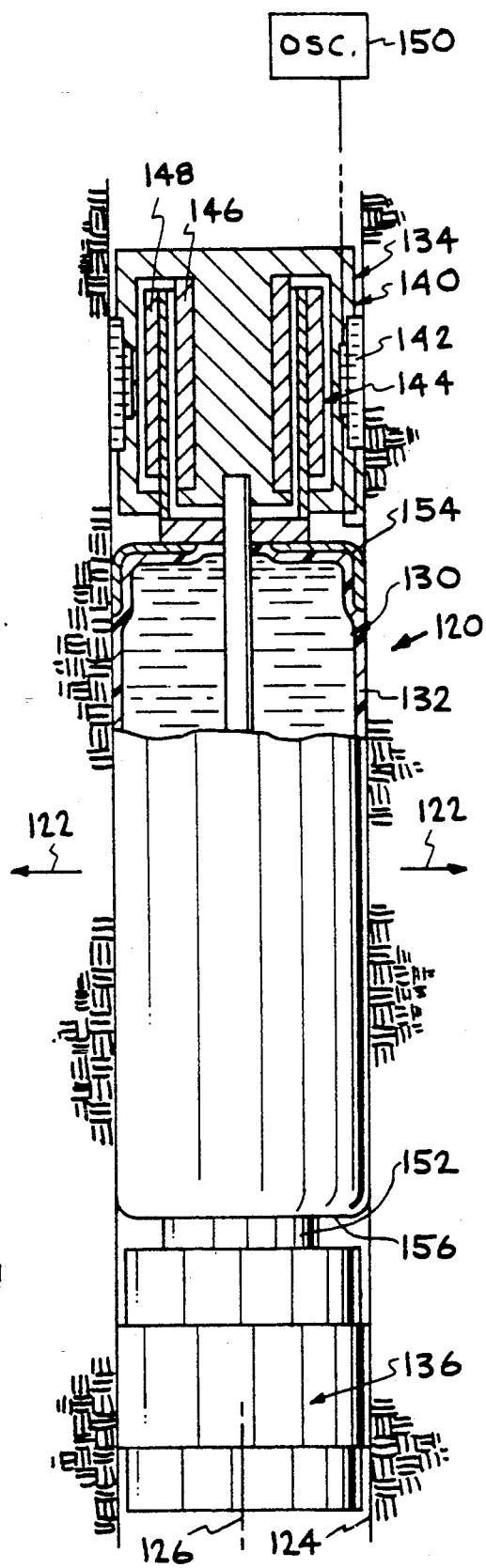
FIG. 6 is a partial sectional view of a pressure wave generator constructed in accordance with another embodiment of the invention.

FIG. 6 illustrates a pressure wave generator apparatus 120 which generates pressure waves indicated at 122 in the walls of a borehole portion 124, with the pressure waves directed away from the axis 126 of the borehole portion. The apparatus includes a hydraulic reservoir 130 which lies in the borehole, with peripheral walls 132 bearing against the walls of the borehole portion and radially expandable with respect to the axis 126 to press against the borehole walls. A pair of substantially identical activators 134, 136 lie at opposite axial ends of the hydraulic reservoir. Each activator such as 134 includes a stator 140 fixed with respect to the walls of the borehole as by a hydraulic clamp 142, and an armature or piston 144 which can slide along the borehole axis relative to the stator. The construction of the stator and armature 140, 142 are largely the same as for the armature in FIG. 4, in that the stator includes a ring-shaped permanent magnet 146 and the armature or piston includes a coil 148 that is energized by an oscillator 150.

The armatures or pistons 144, 152 of the two actuators are energized in sychronism so they simultaneously move towards or away from each other. As the pistons move towards one another, they press against elastically deformable ends 154, 156 of the hydraulic reservoir to compress it axially and therefore cause it to expand radially. The sides of the reservoir press against the walls of the borehole to create pressure waves that radiate largely perpendicular to the axis of the borehole.

Figure 7:
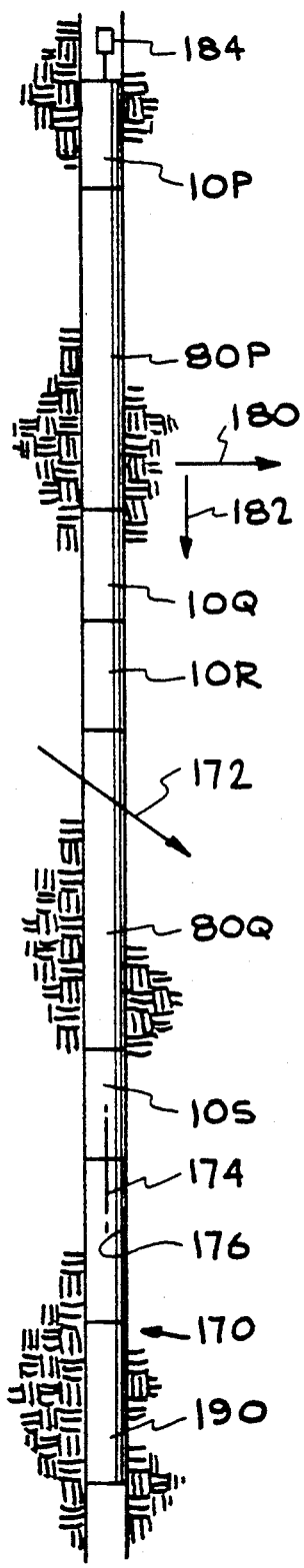
FIG. 7 is a sectional view of a system for generating polarized waves, using apparatus used in other figures herein.

FIG. 7 illustrates a seismic system 170 which can produce polarized shear waves, indicated at 172, which may be directed at any angle with respect to the axis 174 of a borehole 176. The apparatus includes a plurality of torsional shear wave generators 10P, 10Q, 10R, and 10S interspersed with a plurality of axial or longitudinal shear wave generators 80P, 80Q. The placement of the torsional and axial or longitudinal shear wave generators adjacent to one another, results in the shear waves at a distance from the borehole representing a combination, so the resultant direction of the shear waves is between the horizontal direction indicated by arrow 180 and the vertical direction indicated by arrow 182. Generally, all the shear wave generators are operated synchronously, so they have the same frequency and constant phase relationship. The relative amplitudes of the torsional and axial shear waves determine the direction of polarization of the combination. Preferably, the phase relationship is such that all shear wave generators reach maximum wave amplitude at the same time. It may be noted that the system 170 includes four torsional shear wave generators 10P-10S and only two axial shear wave generators 80P and 80Q. This is because the torsional shear wave generators have a limited length because magnetic saturation of their iron will occur if they are made longer with the same current flowing through their coils. A single oscillator 184 can power all of the torsional and axial shear wave generators.

In FIG. 7, a pressure wave generator 190 is also provided. The pressure wave generator 190 will generally be energized at a different time than the shear wave generators, inasmuch as pressure waves move faster through the earth than shear waves so it is difficult to simultaneously use pressure and shear waves together Thus, the invention provides apparatus for generating seismic waves in a closely controllable manner and with reasonable efficiency within a narrow deep borehole. The system uses electrically energized activators that are energized at high power levels for a relatively short period of time, while they rapidly heat up to a temperature short of the temperature that will cause damage to their conductor insulation. The armatures of the actuators are rapidly oscillated, at a frequency of above one Hz, and preferably above ten Hz, to produce high power outputs in a device of relatively small size.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for placement in a portion of a borehole lying in the earth, where the walls of the borehole portion extend along a predetermined axis, for generating seismic waves in the surrounding earth, comprising:

a hydraulic reservoir which can pass into the borehole and which has side walls closely coupled to the borehole walls to push thereagainst and which has opposite ends, said reservoir being compressable and expandable both along said axis and perpendicular thereto;

a pair of piston elements lying at said reservoir ends;

means for synchronously driving said piston elements toward one another to push against the ends of said reservoir, and for ceasing to drive said piston elements toward one another, whereby to cause the reservoir side walls to apply a pressure wave to the surrounding earth.

2. The apparatus described in claim 1 wherein:
said synchronizing means is constructed to oscillate said piston elements in opposite directions at a frequency of over one Hertz.

3. The apparatus described in claim 1 wherein:
said means for synchronously driving includes a stator element associated with each piston element to form two actuators each including a stator element and a piston element, one element of each actuator including a permanent magnet and the other including a conductor oriented so when current flows through the conductor, a magnetic field is created that urges the piston element in one axial direction and the stator in the other, said means for synchronously driving also includes means for delivering current to said conductor which varies at a frequency of at least one Hertz.

4. Apparatus for placement in a borehole portion extending along an axis in the earth, to generate shear waves in the earth at a controllable frequency comprising:
a stator element:
means for clamping said stator element tightly to the walls of said borehole to resist rotation of the stator element;
a rotor element;
rotational bearing means mounting said rotor element on said stator element for allowing said rotor element to turn about an axis largely colinear with the borehole axis;
means for creating interacting magnetic fields urging said rotor to rotate about said axis, including an electrically energizable conductor on at least one of said elements which creates a magnetic field urging said rotor element to rotate;
means for electrically energizing said conductor in a manner that causes said rotor element to rotate alternately in opposite directions about said axis with a change in direction at a rate of at least ten Hertz; and
spring means for urging said rotor toward a predetermined rotational position with respect to said stator and to oscillator said rotor at a predetermined resonant frequency about said axis when said rotor is displaced from said predetermined position, and said means for electrically energizing said conductor is constructed to energize said conductor at said resonant frequency;
said spring means including a hydraulic actuator coupling said rotor and stator, walls forming a reservoir having a height and containing hydraulic fluid coupled to said actuator and containing pressured gas, and means for changing the height of hydraulic fluid in said reservoir.

5. Apparatus for placement in a portion of a borehole lying in the earth, where the walls of the borehole portion extend along a predetermined axis, for generating shear waves in the surrounding earth, comprising:
a stator element;
means for clamping said stator element tightly to the walls of said borehole to resist stator movement parallel to said axis;
an armature element;
bearing means mounting said armature element in substantially linear movement along said axis relative to said stator element;
means for creating interacting magnetic fields urging said armature element to move along said axis, including electrically energizable conductors on at least one of said elements which, when energized, create a magnetic field urging said armature element to move along said axis;
means for electrically energizing said conductors in a manner that causes said armature to move alternately in opposite directions along said axis; and
spring means for urging said rotor toward a predetermined rotational position with respect to said stator and to oscillate said rotor at a predetermined resonant frequency about said axis when said rotor is displaced from said predetermined position, and said means for electrically energizing said conductor is constructed to energize said conductor at said resonant frequency.
said spring means including a hydraulic actuator coupling said rotor and stator, walls forming a reservoir having a height and containing hydraulic fluid coupled to said actuator and containing pressured gas, and means for changing the height of hydraulic fluid in said reservoir.

6. Apparatus for placement in a portion of a borehole lying in the earth, where the walls of the borehole portion extend along a predetermined axis, for generating shear waves in the surrounding earth, comprising:
first and second stator element;
means for clamping said stator elements tightly to the walls of said borehole to resist relative movement between each stator element and the walls of the borehole:
first and second armature elements each moveably mounted to move in first and second opposite directions on a corresponding one of said stator elements; and
electrically energizable means for generating magnetic fields between said stator and armature elements, that accelerate said armature element alternately in opposite directions to create reaction forces in said stator;
said first armature element comprises a rotor mounted to rotate substantially about said predetermined axis on said first stator element;
said second armature element is mounted to move substantially linearly along said predetermined axis relative to said second stator element;
said energizable means is constructed to rotate said rotor in opposite directions about said axis and oscillate said armature in movement along said axis, in synchronism, whereby to generate polarized shear waves.

7. Apparatus for placement in a borehole portion extending along an axis in the earth, to generate shear waves in the earth at a controllable frequency comprising:
a stator element:
means for clamping said stator element tightly to the walls of said borehole to resist rotation of the stator element;
a rotor element;
rotational bearing means mounting said rotor element on said stator element for allowing said rotor element to turn about an axis largely colinear with the borehole axis;

means for creating interacting magnetic fields urging said rotor to rotate about said axis, including an electrically energizable conductor on at least one of said elements which creates a magnetic field urging said rotor element to rotate;

means for electrically energizing said conductor in a manner that causes said rotor element to rotate alternately in opposite directions about said axis with a at a rate of a plurality of Hertz; and spring means for urging said rotor toward a predetermined rotational position with respect to said stator and to oscillate said rotor at a predetermined resonant frequency about said axis when said rotor is displaced from said predetermined position, and said means for electrically energizing said conductor is constructed to energize said conductor at said resonant frequency.

8. A method for generating seismic waves in the portion of the earth which surrounds a portion of a borehole that lies deep within the earh, comprising:

establishing apparatus which includes stator and armature elements, a first of said elements containing a permanent magnet and the second of said elements containing a conductor, within said borehole portion and clamping the stator to the borehole walls;

energizing said apparatus to cause oscillatory movement of said armature on said stator, including applying electrical energy to said conductor which varies at a frequency of at least one Hertz;

said second element includes electrical insulation around said conductor which cannot withstand a temperature of above about 260° C.;

said step of energizing includes applying current of a magnitude to heat at least some of said insulation to a temperature above 150° C. if continued for five minutes, including applying said current for a period of no more than about one minute.

9. Apparatus for placement in a portion of a borehole lying in the earth, where the walls of the borehole portion extend along a predetermined axis, for generating shear waves in the surrounding earth, comprising:

a stator element;

means for clamping said stator element tightly to the walls of said borehole to resist relative movement between them;

an armature element moveably mounted to move in first and second opposite directions on said stator element;

electrically energizable means for generating magnetic fields between said stator and armature elements, that accelerate said armature element alternately in said first and second opposite directions to create reaction faces in said stator, whereby to produce shear waves in the surrounding earth; and an additional stator element and an additional armature element, said clamping means constructed to clamp said additional stator element to said borehole walls at a location which is adjacent to the location of the first named stator element;

a first of said armature elements comprises a rotor mounted to rotate substantially about said predetermined axis on a first of said stator elements;

a second of said armature elements is mounted to move substantially linearly along said predetermined axis relative to said stator element;

said energizable means is constructed to rotate said rotor in opposite directions about said axis and oscillate said armature in movement along said axis, in synchronism, whereby to generate polarized shear waves.

10. Apparatus for placement in a borehole portion extending along an axis in the earth, to generate shear waves in the earth at a controllable frequency comprising:

a stator element;

means for clamping said stator element tightly to the walls of said borehole to resist rotation of the stator element;

a rotor element;

rotational bearing means mounting said rotor element on said stator element for allowing said rotor element to turn about an axis largely colinear with the borehole axis;

means for creating interacting magnetic fields urging said rotor to rotate about said axis, including an electrically energizable conductor on at least one of said elements which creates a magnetic field urging said rotor element to rotate;

means for electrically energizing said conductor in a manner that causes said rotor element to rotate alternately in opposite directions about said axis with a change in direction of at least ten Hertz, whereby to create an alternating torsional shear wave in the earth; and spring means for urging said rotor toward a predetermined rotational position with respect to said stator and to oscillate said rotor at a predetermined resonant frequency about said axis when said rotor is displaced from said predetermined position, and said means for electrically energizing said conductor is constructed to energize said conductor at said resonant frequency.

11. The apparatus described in claim 10 wherein:

said spring means includes a hydraulic actuator coupling said rotor and stator, walls forming a reservoir having a height and containing hydraulic fluid coupled to said actuator and containing pressured gas, and means for changing the height of hydraulic fluid in said reservoir.

12. Apparatus for placement in a portion of a borehole lying in the earth, where the walls of the borehole portion extend along a predetermined axis, for generating shear waves in the surrounding earth, comprising:

a stator element' means for clamping said stator element tightly to the walls of said borehole to resist stator movement parallel to said axis;

an armature element;

bearing means mounting said armature element in substantially linear movement along said axis relative to said stator element;

means for creating interacting magnetic fields urging said armature element to move along said axis, including electrically energizable conductors on at least one of said elements which, when energized, create a magnetic field urging said armature element to move along said axis;

means for electrically energizing said conductors in a manner that causes said armature to move alternately in opposite directions along said axis; and spring means for urging said armature toward a predetermined axial position with respect to said stator and to oscillate said armature at a predetermined resonance frequency along said axis when said armature is displaced from said predetermined position, and said means for electrically energizing said conductor is constructed to energize said conductor at said resonant frequency.

13. The apparatus described in claim 12 wherein:
said spring means includes a hydraulic actuator coupling said rotor and stator, walls forming a reservoir having a height and containing hydraulic fluid coupled to said actuator and containing pressured gas, and means for changing the height of hydraulic fluid in said reservoir.

14. A method for generating seismic waves int he portion of the earth which surrounds a portion of a borehole that lies deep within the earth, comprising:
establishing apparatus which includes stator and armature elements, one element containing a permanent magnet and the other a conductor, within said borehole portion and clamping the stator to the borehole walls;
energizing said apparatus to cause oscillatory movement of said armature on said stator including applying electrical energy to said conductor which varies at a frequency of at least one hertz;
said other element includes electrical insulation around said conductor which cannot withstand a temperature above about 250° C.;
said step of energizing includes applying current of a magnitude to heat at least some of said insulation to a temperature above 150° C. within one minute, and which would heat said insulation to above 250° C. if continued for five minutes, including applying said current for a period of no more than about one minute.

* * * * *